United States Patent
Ketfi-Cherif et al.

(10) Patent No.: US 9,376,106 B2
(45) Date of Patent: Jun. 28, 2016

(54) METHOD AND CORRESPONDING DEVICE FOR COUPLING A SHAFT OF AN ELECTRIC MOTOR WITH A WHEEL SHAFT OF AN ELECTRICALLY POWERED OR HYBRID MOTOR VEHICLE

(71) Applicant: RENAULT s.a.s., Boulogne Billancourt (FR)

(72) Inventors: Ahmed Ketfi-Cherif, Elancourt (FR); Gregory Launay, Paris (FR); Abdelmalek Maloum, Chevilly la Rue (FR)

(73) Assignee: RENAULT s.a.s, Boulogne Billancourt (FR)

( * ) Notice: Subject to any disclaimer, the term of this patent is extended or adjusted under 35 U.S.C. 154(b) by 0 days.

(21) Appl. No.: 14/647,334

(22) PCT Filed: Nov. 26, 2013

(86) PCT No.: PCT/EP2013/074683
§ 371 (c)(1),
(2) Date: Sep. 16, 2015

(87) PCT Pub. No.: WO2014/080029
PCT Pub. Date: May 30, 2014

(65) Prior Publication Data
US 2016/0001770 A1    Jan. 7, 2016

(30) Foreign Application Priority Data
Nov. 26, 2012 (FR) ..................................... 12 61216

(51) Int. Cl.
| | |
|---|---|
| *B60W 10/08* | (2006.01) |
| *B60W 20/00* | (2016.01) |
| *B60W 10/02* | (2006.01) |
| *F16H 61/04* | (2006.01) |
| *F16H 61/00* | (2006.01) |

(52) U.S. Cl.
CPC .............. *B60W 20/40* (2013.01); *B60W 10/02* (2013.01); *B60W 10/08* (2013.01);
(Continued)

(58) Field of Classification Search
None
See application file for complete search history.

(56) References Cited

U.S. PATENT DOCUMENTS

| | | | |
|---|---|---|---|
| 5,951,436 A | 9/1999 | Kim | |
| 6,717,281 B1 * | 4/2004 | Brandon | ............. B60L 11/1807 180/65.245 |

(Continued)

FOREIGN PATENT DOCUMENTS

| | | |
|---|---|---|
| EP | 1 955 885 A2 | 8/2008 |
| EP | 2 138 371 A1 | 12/2009 |
| FR | 2 954 441 A1 | 6/2011 |

OTHER PUBLICATIONS

International Search Report Issued Jan. 21, 2014 in PCT/EP13/074683 Filed Nov. 26, 2013.

(Continued)

*Primary Examiner* — Justin Holmes
(74) *Attorney, Agent, or Firm* — Oblon, McClelland, Maier & Neustadt, L.L.P.

(57) ABSTRACT

A method and device for coupling an electric motor shaft with a wheel shaft of a vehicle includes measurement of rotation speed of the electric motor and measurement of rotation speed of the wheels. The method also includes formulating via a closed-loop control a first operating setpoint for the electric motor based on the measured rotation speed of the electric motor and the measured rotation speed of the wheels; formulating a second operating setpoint based on the measured rotation speed of the wheels to which at least one coefficient is applied; controlling the operation of the motor around a final operating setpoint formulated based on adding together the first and second operating setpoints; and coupling, if the measured speed of the wheels to which the at least one coefficient is applied is equal to the measured speed of the motor, the electric motor shaft with the wheel shaft.

10 Claims, 2 Drawing Sheets

(52) U.S. Cl.
CPC ... *F16H 61/0403* (2013.01); *B60W 2510/0283* (2013.01); *B60W 2520/26* (2013.01); *B60W 2710/083* (2013.01); *B60Y 2300/73* (2013.01); *B60Y 2400/421* (2013.01); *F16H 2061/0078* (2013.01); *F16H 2061/0422* (2013.01); *F16H 2061/0474* (2013.01)

(56) References Cited

U.S. PATENT DOCUMENTS

| | | | |
|---|---|---|---|
| 2006/0061309 A1* | 3/2006 | Rudinec | B60L 11/1803 318/139 |
| 2008/0190675 A1 | 8/2008 | Itoh et al. | |
| 2010/0131164 A1* | 5/2010 | Carter | B60L 11/1805 701/61 |
| 2012/0259494 A1 | 10/2012 | Schaeffer et al. | |
| 2013/0297112 A1* | 11/2013 | Gibson | B60W 20/50 701/22 |

OTHER PUBLICATIONS

French Search Report Issued Jul. 19, 2013 in French Application 12 61216 Filed Nov. 26, 2012.

\* cited by examiner

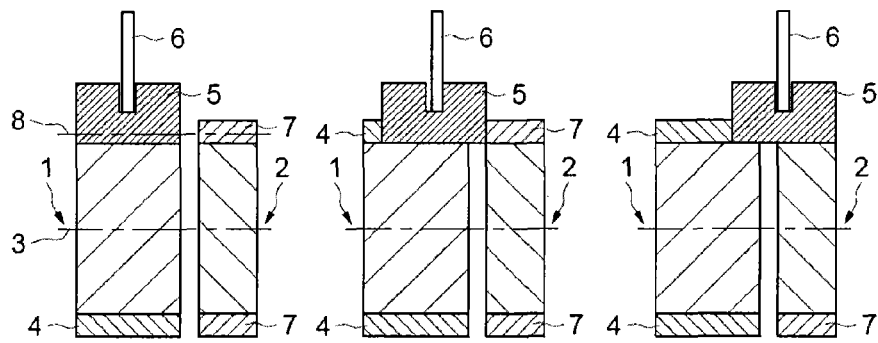
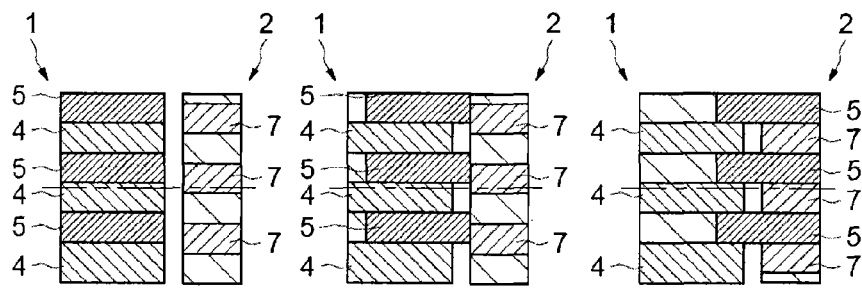
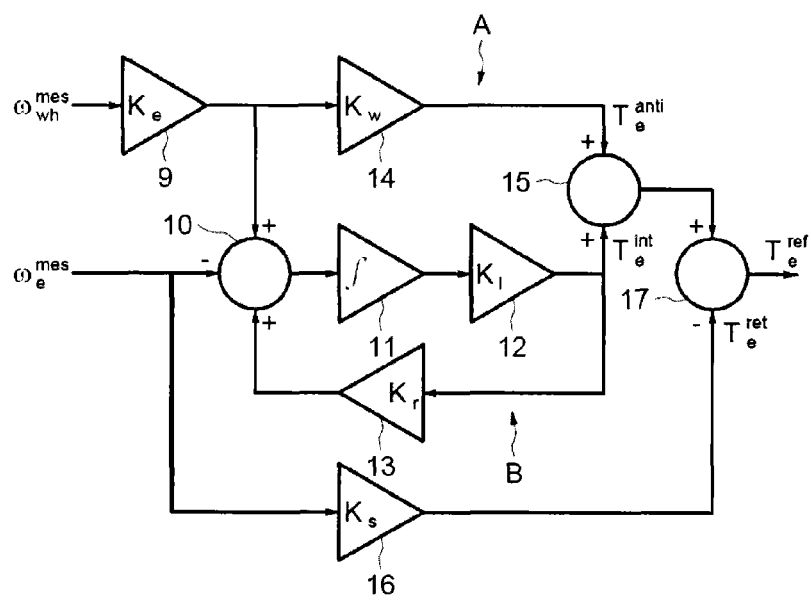

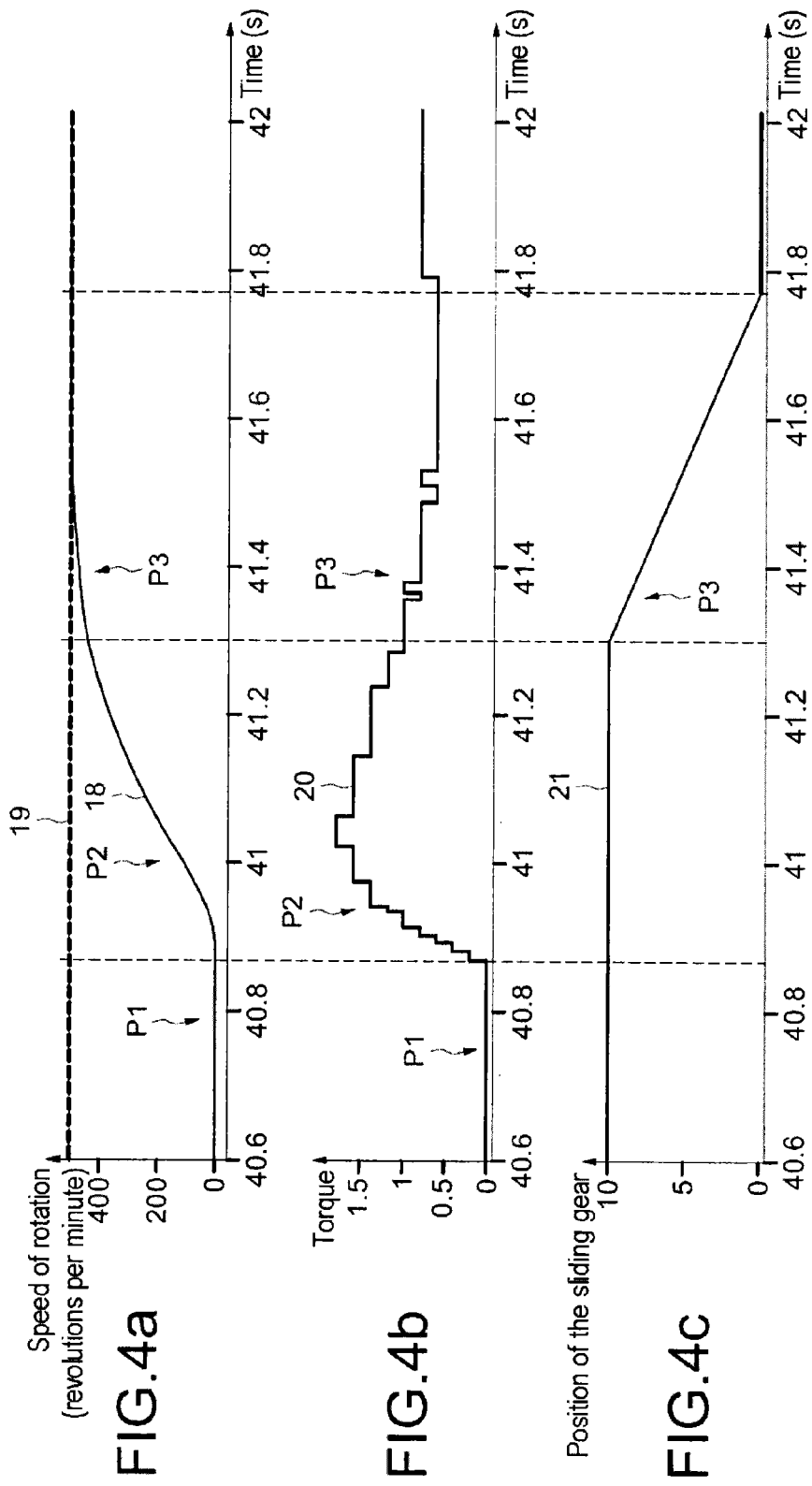

METHOD AND CORRESPONDING DEVICE FOR COUPLING A SHAFT OF AN ELECTRIC MOTOR WITH A WHEEL SHAFT OF AN ELECTRICALLY POWERED OR HYBRID MOTOR VEHICLE

BACKGROUND OF THE INVENTION

The invention relates to electrically powered or hybrid motor vehicles and more particularly to the coupling of an electric motor shaft with a wheel shaft.

Hybrid vehicles comprising two drive systems, i.e. a heat engine and an electric motor, are known. Conventionally, when switching from one type of propulsion to another type of propulsion, the couplings between the shafts are established between shafts rotating at the same speed. For example, within a vehicle travelling at a certain speed, the coupling between the shaft of an electric motor and that of the wheels will cause jolting if the shaft of the electric motor does not rotate at the same speed as the wheels of the vehicle. The coupling or the decoupling can be implemented when a speed threshold is reached.

It is therefore necessary to control the speed of the electric motor in order to make this equal to that of the shaft of the wheels during a coupling phase (for example when the speed falls again below a threshold).

To this end, it has been proposed in European patent application EP 2 138 371 to implement a method in which an electric motor is controlled around a speed of rotation close to, but not necessarily equal to, that of the shaft of the wheels, and a mechanical synchronization device is then used to obtain an equalization of the speeds. This solution has the disadvantage of requiring a mechanical synchronization device.

In addition, it is necessary to quickly bring the speed of the electric motor close to that of the wheels in order to obtain an almost instantaneous coupling. Further existing solutions make it possible to quickly increase the speed of the electric motor, but once equality has been obtained, the speed of the motor may continue to rise, which causes jolting.

BRIEF SUMMARY OF THE INVENTION

One object of the present invention is therefore to obtain a coupling between an electric motor shaft and a wheel shaft without jolting, that is to say with equal speeds of rotation, and which does not require a synchronization device.

A further object of the invention is to obtain a rapid coupling.

In accordance with one aspect, a method for coupling a shaft of an electric motor with a wheel shaft of an electrically powered or hybrid motor vehicle is proposed, said method comprising a measurement of the speed of rotation of the electric motor and a measurement of the speed of rotation of the wheels.

In accordance with a general feature, the method comprises:
 a closed-loop control to formulate a first operating setpoint for the electric motor on the basis of the measured speed of rotation of the electric motor and the measured speed of rotation of the wheels, said control involving an integration,
 formulating a second operating setpoint on the basis of the measured speed of rotation of the wheels to which at least one coefficient is applied, for example a control by anticipation,
 control of the operation of the motor around a final operating setpoint formulated on the basis of adding together the first and second operating setpoints, and,
 if the measured speed of the wheels to which said at least one coefficient is applied is equal to the measured speed of the motor, a coupling of the shaft of the electric motor with the wheel shaft.

The final operating control thus formulated makes it possible to obtain a control of the speed of rotation of the electric motor around the speed of rotation of the wheels, possibly except for a multiplying factor. In addition, it is not necessary to use a mechanical synchronizer.

The sum of the operating setpoints formulated on the one hand by a control loop with an integration and on the other hand by anticipation makes it possible to obtain a final operating setpoint value, for example a torque setpoint, which is minimal when the speeds of rotation are equal (except for a multiplying factor). This minimal setpoint is the smallest operating setpoint that can be transmitted to the electric motor in order to obtain the desired speed. An improved speed control which requires less energy is thus obtained.

It can also be noted that the use of a setpoint formulated by anticipation makes it possible to quicken the development of the speed of the electric motor. In fact, when implementing the method (for example when the speed of rotation of the electric motor is zero), the speed of the wheels, which is not zero, is used directly to formulate the second operating setpoint, which quickly increases the speed of rotation of the electric motor.

The closed-loop control may comprise a comparison between on the one hand the measured speed of the wheels to which a first coefficient is applied, for example a multiplying coefficient corresponding to a reduction between the shaft of the motor and the shaft of the wheels, added to the feedback of the first operating setpoint to which a second coefficient is applied, and on the other hand the measured speed of the electric motor, an integration of the result of the comparison, and a multiplication of the results of the integration by a third coefficient so as to obtain the first operating setpoint.

The second coefficient can be selected so as to increase the value of the distance between the speeds and thus accelerate the control and therefore for example the increase of the speed of the electric motor.

The third coefficient in the feedback loop can be selected to ease the increase of the speed of the electric motor when this speed approaches that of the wheels. In fact, the multiplication by a third coefficient makes it possible to reduce the value of the derivative of the setpoint by approaching the equality of the speeds. A lower final setpoint value is thus obtained in order to obtain the desired speed, which makes it possible to obtain a coupling without jolting.

The formulation of the second operating setpoint may involve a multiplication of the measured speed of rotation of the wheels by a fourth coefficient. The speed of rotation is thus multiplied by the first coefficient, which can be a multiplying coefficient corresponding to a reduction between the shafts, and by another coefficient for the formulation of the setpoint by anticipation.

The fourth coefficient, for its part, can be selected to accelerate even more the development of the speed of the electric motor, without causing instability. In fact, from the moment of implementation of the method, it multiplies the measured speed of the wheels, which is not zero during the coupling.

The method may also comprise, in addition, subsequently to the step of adding together the first operating setpoint and the second operating setpoint, a comparison between on the one hand the sum of the first operating setpoint and the second operating setpoint, and on the other hand the measured speed of the electric motor to which a fifth coefficient is applied, so as to deduce from this the final operating setpoint for the electric motor.

The fifth coefficient can also be selected so as to accelerate the development of the speed once the measured speed of the electric motor is no longer zero.

Of course, a person skilled in the art will be able to select the different coefficients in order to obtain a rapid development of the speed of the electric motor and an easing of this development prior to the coupling.

The vehicle may comprise a first electric motor for a first wheel and a second electric motor for a second wheel, the shaft of the first electric motor being coupled with the shaft of the first wheel at the same time as the coupling of the shaft of the second electric motor with the shaft of the second wheel.

The invention is particularly well suited to vehicles provided with two electric machines connected respectively to wheels, for example the wheels of the rear axle. Due to the symmetry of the rear axle, the operating setpoint calculations are the same for the two machines.

In accordance with a further aspect, a device for controlling the coupling between a shaft of an electric motor and a wheel shaft of an electrically powered or hybrid motor vehicle is proposed, the vehicle comprising means for measuring the speed of rotation of the electric motor and means the measuring the speed of rotation of the wheels.

In accordance with a general feature, the device comprises a calculation unit comprising:
  closed-loop control means for formulating a first operating setpoint of the electric motor on the basis of the measured speed of rotation of the electric motor and the measured speed of rotation of the wheels, the control means comprising integration means,
  means for formulating a second operating setpoint on the basis of the measured speed of rotation of the wheels to which at least one coefficient is applied,
  means for controlling the operation of the electric motor around a final operating setpoint, these control means comprising an adder for adding together the first and the second operating setpoint, and
  means for controlling the coupling of the shaft of the electric motor with the shaft of the wheel if the measured speed of the wheels to which said at least one coefficient is applied is equal to the measured speed of the motor.

The closed-loop control means may comprise means for comparison between on the one hand the measured speed of the wheels to which a first coefficient is applied added to the feedback of the first operating setpoint to which a second coefficient is applied, and on the other hand the measured speed of the electric motor, means for integration of the result of the comparison, and means for multiplying the result of the integration by a third coefficient so as to obtain the first operating setpoint.

The means for formulating the second operating setpoint may comprise means for multiplying the measured speed of rotation of the wheels by a fourth coefficient.

The device may also comprise means for comparison between on the one hand the sum of the first operating setpoint and the second operating setpoint, and on the other hand the measured speed of the electric motor to which a fifth coefficient is applied, in order to obtain the final operating setpoint for the electric motor.

The vehicle may comprise a first electric motor for a first wheel and a second electric motor for a second wheel, the device being able to control simultaneously the coupling of each electric motor shaft on each wheel shaft.

BRIEF DESCRIPTION OF THE DRAWINGS

Further objectives, features and advantages will become clear upon reading the following description, which is given solely by way of non-limiting example and with reference to the accompanying drawings, in which:

FIGS. 1a, 1b, 1c, 2a, 2b and 2c schematically illustrate the coupling of a wheel shaft and an electric motor shaft, FIG. 3 schematically illustrates a mode of implementation in accordance with the invention, and FIGS. 4a, 4b and 4c illustrate the development of the speed and other parameters of the electric motor as a function of time during a coupling.

DETAILED DESCRIPTION OF THE INVENTION

FIG. 1a shows a first pinion 1, for example connected to the shaft of an electric motor, and a second pinion 2, for example connected to the shaft of a wheel. The first and second pinions 1 and 2 are shown from the front, the axis of rotation 3 thereof being shown by a dashed line. The pinion 1 comprises a set of teeth of which one tooth 4 is visible. A sliding gear 5, enabling shafts to be coupled, is coupled to teeth of the pinion 1. The sliding gear 5 may be moved in translation by the action of a fork 6.

The second pinion is equipped with a plurality of teeth 7 and may, in the case shown in FIG. 1a, have a movement of rotation solely linked with that of the wheels.

FIG. 2a shows another view of the pinions 1 and 2 corresponding to a view in the plane of section bearing the reference 8 in FIG. 1a. The sliding gear 5 comprises a plurality of teeth 5 coupled with the teeth 4 of the pinion 1. In this figure, the teeth 7 of the pinion 2 are free.

FIGS. 1b and 2b show the first and second pinions 1 and 2 after a first translation of the sliding gear 5. The translation can be implemented when the speeds of rotation of the two pinions are equal, for example when the speeds of rotation of the wheels and of the electric motor are equal except for a multiplying factor.

FIGS. 1c and 2c show the first and second pinions 1 and 2 with the sliding gear in its final position corresponding to a coupling between the pinions 1 and 2 and therefore between the shaft of the electric motor and the shaft of at least one wheel.

It should be noted that the equality of the speeds makes it possible to avoid the appearance of jolting during the coupling of the shafts. To this end, it is necessary to control the speed of the electric motor, and therefore of the pinion 1, in order to obtain a coupling of good quality, moreover without the need for a mechanical synchronizer.

FIG. 3 schematically shows an example of a coupling control device according to the invention, providing a control of the speed of the electric motor so as to allow a coupling. This control as well as the device can be provided within a calculating unit, for example an electronic control unit located within an electrically powered or hybrid motor vehicle.

This device in the first instance comprises means for measuring the speed of rotation of at least one wheel denoted $\omega_{wh}^{mes}$ and the speed of rotation of the electric motor of a motor vehicle denoted $\omega_e^{mes}$. These speeds of rotation are measured, for example, by rotational speed sensors of the vehicle. This device also comprises closed-loop control means B, means for formulating an operating setpoint by anticipation A, and means for controlling the coupling (not shown) of an electric motor shaft with a wheel shaft.

The measured speed $\omega_{wh}^{mes}$ can be provided to multiplication means 9 for multiplication by a first coefficient denoted $K_e$ corresponding, for example, to a reduction factor between the wheel shaft and the shaft of the electric motor. In other words, the coupling can be implemented if the following equation is verified:

$$\omega_{wh}^{mes} K_e = \omega_e^{mes}$$

The measured speed of rotation of the wheels $\omega_{wh}^{mes}$ to which the coefficient $K_e$ is applied then compared to the measured speed of rotation of the electric motor $\omega_e^{mes}$ in a comparator 10. These two speeds of rotation are the two inputs of the control loop B. The output of the comparator 10 is connected to integration means 11. The use of the integration means 11 makes it possible to reduce the distance between the speeds.

The output of the integration means 11 is connected to multiplication means 12 by another coefficient $K_i$, making it possible to obtain at the output of the control loop B an operating setpoint for an electric motor (denoted $T_e^{int}$). The coefficient $K_i$ is selected to increase the distance obtained at the output of the comparator and thus develop more quickly the speed of rotation of the electric motor. This setpoint is looped to another input of the comparator 10 after a multiplication (multiplication means 13) by another coefficient $K_r$, selected to obtain an easing of the development of the speed of rotation of the electric motor in the vicinity of the speed of rotation of the wheels.

The measured speed of rotation of the wheels $\omega_{wh}^{mes}$ to which the coefficient $K_e$ is applied is also used within the means A to formulate an operating setpoint by anticipation, after a multiplication by a coefficient $K_w$ by the multiplication means 14. This anticipation makes it possible, prior even to the control, to send a torque setpoint to the electric motor in order to gain responsiveness. The parameter $K_w$ is defined essentially by the features of the motor itself, and in particular the inertia thereof, as well as by the conditions of stability of the system. An operating setpoint denoted $T_e^{anti}$ is thus obtained at the output of the multiplication means 14.

The two operating setpoints $T_e^{anti}$ and $T_e^{int}$ are then added together by the adding means 15. In addition, so as to obtain even more quickly an equality between the speeds of rotation (except for a multiplying factor), it is possible to use a state feedback thanks to the multiplication means 16 of the measured speed of rotation of the electric motor $\omega_e^{mes}$ with a multiplication by a coefficient $K_s$ to obtain an operating setpoint ($T_e^{ret}$ and a comparison by comparison means 17. The output of the comparison means 17 (operating setpoint $T_e^{ref}$) is then provided to the electric motor, for example to increase the speed of rotation thereof and to reach that of the wheels (except for a multiplying factor). Means for controlling the coupling can then implement the coupling.

FIG. 4a shows the development of the speed of rotation of the electric motor (curve 18, solid line) and the development of the speed of rotation of the wheels (curve 19, dashed line) within a motor vehicle able to implement a method according to the invention. The speed of the wheels is constant here, greater than 400 revolutions per minute.

Prior to the coupling of the shafts, the speed of rotation of the electric motor is zero (phase P1). Then, the speed increases rapidly in a phase P2, in particular thanks to the formulation of a setpoint by anticipation. Lastly, in a phase P3, the speed of rotation of the electric motor develops more gently, in particular thanks to the integral action with a feedback loop. It is thus possible to implement a coupling between the two shafts without jolting perceived by the driver of the vehicle.

FIG. 4b shows the development of the setpoint torque provided at the electric motor (curve 20). Here, the phase P1 corresponds to a setpoint value of zero (phase P1), the phase P2 corresponds to a rapid development of the setpoint, and the phase P3 corresponds to a decrease of the setpoint so as to obtain a speed of rotation of the electric motor stabilized around the speed of the wheels.

Lastly, FIG. 4c shows the development of the position of the sliding gear 5 (curve 21) making it possible to obtain the coupling, for example the sliding gear 5. It can be noted that the position of the sliding gear only passes from the free position to the coupled position from the phase P3.

A coupling that requires a period of a second between the start of the phase P2 and the end of the coupling (sliding gear in final position) is obtained.

Thanks to the invention, a rapid coupling is obtained, requiring fewer mechanical parts and without jolting. Thus, it is possible to reduce the cost of the components and to prolong the service life of the mechanical parts, which is reduced when jolting occurs.

The invention claimed is:

1. A method for coupling an electric motor shaft with a wheel shaft of an electrically powered or hybrid motor vehicle, said method comprising a measurement of the speed of rotation of the electric motor ($\omega_e^{mes}$) and a measurement of the speed of rotation of the wheels ($\omega_{wh}^{mes}$), said method comprising:
   formulating via a closed-loop control a first operating setpoint ($T_e^{int}$) for the electric motor on the basis of the measured speed of rotation of the electric motor and the measured speed of rotation of the wheels, said control involving an integration,
   formulating a second operating setpoint ($T_e^{anti}$) on the basis of the measured speed of rotation of the wheels to which at least one coefficient is applied,
   controlling the operation of the motor around a final operating setpoint ($T_e^{ref}$) formulated on the basis of adding together the first and second operating setpoints, and
   coupling, when the measured speed of the wheels to which said at least one coefficient is applied is equal to the measured speed of the motor, the shaft of the electric motor with the wheel shaft.

2. The method according to claim 1, wherein the closed-loop control comprises a comparison between on the one hand the measured speed of the wheels to which a first coefficient ($K_e$) is applied added to the feedback of the first operating setpoint to which a second coefficient ($K_r$) is applied, and on the other hand the measured speed of the electric motor, an integration of the results of the comparison, and a multiplication of the results of the integration by a third coefficient ($K_i$) so as to obtain the first operating setpoint ($T_e^{int}$).

3. The method according to claim 1, wherein the formulation of the second operating setpoint involves a multiplication of the measured speed of rotation of the wheels by a fourth coefficient ($K_w$).

4. The method according to claim 1, further comprising, subsequently to the step of adding together the first operating setpoint and the second operating setpoint, a comparison between on the one hand the sum of the first operating setpoint and the second operating setpoint, and on the other hand the measured speed of the electric motor to which a fifth coefficient ($K_s$) is applied, so as to deduce from this the final operating setpoint for the electric motor.

5. The method according to claim 1, wherein the vehicle comprises a first electric motor for a first wheel and a second electric motor for a second wheel, the shaft of the first electric motor being coupled with the shaft of the first wheel at the same time as the coupling of the shaft of the second electric motor with the shaft of the second wheel.

6. A device for controlling the coupling between a shaft of an electric motor and a wheel shaft of an electrically powered or hybrid vehicle, the vehicle comprising means for measuring the speed of rotation of the electric motor ($\omega_e^{mes}$) and means for measuring the speed of rotation of the wheels ($\omega_{wh}^{mes}$), said device comprising:

a calculating unit comprising:
    closed-loop control means for formulating a first operating setpoint ($T_e^{int}$) of the electric motor on the basis of the measured speed of rotation of the electric motor and the measured speed of rotation of the wheels, the control means comprising integration means,
    means for formulating a second operating setpoint ($T_e^{anti}$) on the basis of the measured speed of rotation of the wheels to which at least one coefficient is applied,
    means for controlling the operation of the electric motor around a final operating setpoint ($T_e^{ref}$), the control means comprising an adder for adding together the first and the second operating setpoint, and
    means for controlling the coupling of the shaft of the electric motor with the shaft of the wheel when the measured speed of the wheels to which said at least one coefficient is applied is equal to the measured speed of the motor.

7. The device according to claim 6, wherein the closed-loop control means comprise means for comparison between on the one hand the measured speed of the wheels to which a first coefficient ($K_e$) is applied added to the feedback of the first operating setpoint to which a second coefficient ($K_r$) is applied, and on the other hand the measured speed of the electric motor, means for integration of the result of the comparison, and means for multiplying the result of the integration by a third coefficient ($K_i$) so as to obtain the first operating setpoint.

8. The device according to claim 6, wherein the means for formulating the second operating setpoint comprise means for multiplying the measured speed of rotation of the wheels by a fourth coefficient ($K_w$).

9. The device according to claim 6, further comprising means for comparison between on the one hand the sum of the first operating setpoint and the second operating setpoint, and on the other hand the measured speed of the electric motor to which a fifth coefficient ($K_s$) is applied, in order to obtain the final operating setpoint for the electric motor.

10. The device according to claim 6, wherein the vehicle comprises a first electric motor for a first wheel and a second electric motor for a second wheel, the device being able to control simultaneously the coupling of each electric motor shaft on each wheel shaft.

* * * * *